US010467717B2

(12) United States Patent
Cai et al.

(10) Patent No.: US 10,467,717 B2
(45) Date of Patent: Nov. 5, 2019

(54) AUTOMATIC UPDATE DETECTION FOR REGULATION COMPLIANCE

(71) Applicant: International Business Machines Coporation, Armonk, NY (US)

(72) Inventors: Keke Cai, Beijing (CN); HongLei Guo, Beijing (CN); Zhili Guo, Beijing (CN); Jianmin Jiang, Beijing (CN); Feng Jin, Beijing (CN); Zhong Su, Beijing (CN); Changhua Sun, Beijing (CN); Guoyu Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 15/081,194

(22) Filed: Mar. 25, 2016

(65) Prior Publication Data

US 2017/0103486 A1    Apr. 13, 2017

Related U.S. Application Data

(60) Provisional application No. 62/238,663, filed on Oct. 7, 2015.

(51) Int. Cl.
*G06Q 30/00* (2012.01)
*G06Q 50/00* (2012.01)
(Continued)

(52) U.S. Cl.
CPC ....... *G06Q 50/205* (2013.01); *G06F 17/2785* (2013.01); *G06Q 30/018* (2013.01); *G06Q 50/01* (2013.01)

(58) Field of Classification Search
CPC .... G06Q 50/01; G06Q 30/018; G06Q 50/205; G06F 17/2785
See application file for complete search history.

(56) References Cited

U.S. PATENT DOCUMENTS 5,999,907 A    12/1999 Donner
6,154,725 A    11/2000 Donner
(Continued)

FOREIGN PATENT DOCUMENTS

WO    0102987    1/2001

OTHER PUBLICATIONS

Rupilele, F. G. J., Manongga, D., & Utomo, W. H. (2013). Sentiment analysis of national exam public policy with naive bayes classifier method (NBC). Journal of Theoretical and Applied Information Technology, 58(1), 157-65. (Year: 2013).*

(Continued)

*Primary Examiner* — Amanda C Abrahamson
(74) *Attorney, Agent, or Firm* — Chan & Samuels, LLP

(57) ABSTRACT

An embodiment of the invention provides a method comprising monitoring publications for regulatory changes with a monitoring device, and identifying at least one regulatory change based on the monitoring of the publications. The monitoring device monitors published comments to the identified regulatory change. A processor connected to the monitoring device identifies one or more topics and/or objects in the regulatory change and/or the published comments. An alert generating device connected to the processor generates an alert including one or more policies above a threshold level of likelihood that the policy will be affected by the regulatory change.

18 Claims, 16 Drawing Sheets

(51) Int. Cl.
*G06F 17/27* (2006.01)
*G06Q 50/20* (2012.01)

(56) References Cited

U.S. PATENT DOCUMENTS

| | | |
|---|---|---|
| 6,308,164 B1 | 10/2001 | Nummelin et al. |
| 6,556,992 B1 | 4/2003 | Barney et al. |
| 7,089,192 B2 | 8/2006 | Bracchitta et al. |
| 7,194,691 B1 | 3/2007 | Zilka et al. |
| 7,386,460 B1 | 6/2008 | Frank et al. |
| 7,516,137 B1 | 4/2009 | Earle et al. |
| 7,493,262 B2 | 12/2009 | Hagelin |
| 8,645,180 B1 | 2/2014 | Zeng |
| 2002/0107698 A1 | 8/2002 | Brown et al. |
| 2003/0036947 A1 | 2/2003 | Smith, III et al. |
| 2003/0172020 A1 | 9/2003 | Davies et al. |
| 2004/0054545 A1 | 3/2004 | Knight |
| 2004/0093244 A1 | 5/2004 | Hatcher et al. |
| 2004/0139053 A1 | 7/2004 | Haunschild |
| 2005/0138070 A1 | 6/2005 | Huberman et al. |
| 2005/0149401 A1 | 7/2005 | Ratcliffe et al. |
| 2005/0154673 A1 | 7/2005 | Fellenstein et al. |
| 2006/0031092 A1 | 2/2006 | Cronin et al. |
| 2006/0080136 A1 | 4/2006 | Frank et al. |
| 2008/0243889 A1 | 10/2008 | Chen et al. |
| 2009/0313207 A1 | 12/2009 | Boss et al. |
| 2010/0191564 A1 | 7/2010 | Lee et al. |
| 2010/0235219 A1 | 9/2010 | Merrick et al. |
| 2010/0235297 A1* | 9/2010 | Mamorsky ............ G06Q 40/06 705/36 R |
| 2010/0332285 A1 | 12/2010 | Dunagan et al. |
| 2011/0010309 A1 | 1/2011 | Dunagan et al. |
| 2012/0084114 A1 | 4/2012 | Prow et al. |
| 2012/0197896 A1* | 8/2012 | Li .................. H04L 29/08072 707/740 |
| 2014/0025593 A1 | 1/2014 | Dolin et al. |
| 2015/0142888 A1* | 5/2015 | Browning ............ H04L 12/1831 709/204 |
| 2015/0195406 A1* | 7/2015 | Dwyer ................ H04M 3/5175 379/265.07 |
| 2016/0086454 A1* | 3/2016 | Kelly, III ................. G07G 5/00 705/24 |
| 2016/0203494 A1* | 7/2016 | Galligan ............. G06Q 30/018 705/317 |

OTHER PUBLICATIONS

Diaz-Aviles, E.; Orellana-Rodriguez, C.; Nejdl, W.. Taking the pulse of political emotions in latin america based on social web streams. 2012 Eighth Latin American Web Congress (LA-WEB): 40-7;vii+123. IEEE. (2012) (Year: 2012).*

WebRegMT Overview, European Patent Register [online], [retrieved on May 18, 2009]. Retrieved from the Internet Archive Wayback Machine using <URL: http://web.archive.org> and <URL: http://web.archive.org/web/*/http://docs.epoline.org/doc/epoline/myepoline/en/WebRegMT_Help_EN.htm>.

Business Insights Workbench, International Business Machines Corporation [online], [retrieved on May 18, 2009]. Retrieved from the Internet using <URL: http://www.almaden.ibm.com/asr/projects/biw/biw-index.shtml>.

* cited by examiner

AUTOMATIC UPDATE DETECTION FOR REGULATION COMPLIANCE

CROSS-REFERENCE TO RELATED APPLICATIONS

This application claims the benefit of U.S. Provisional Patent Application Ser. No. 62/238,663 filed Oct. 7, 2015, which is hereby incorporated by reference.

FIELD OF THE INVENTION

The present invention relates to systems, methods, and computer program products for automatic update detection for regulation compliance.

SUMMARY OF THE INVENTION

An embodiment of the invention provides a method comprising monitoring publications for regulatory changes with a monitoring device, and identifying at least one regulatory change based on the monitoring of the publications. The monitoring device monitors published comments to the identified regulatory change. A processor connected to the monitoring device identifies one or more topics and/or objects in the regulatory change and/or the published comments. An alert generating device connected to the processor generates an alert including one or more policies above a threshold level of likelihood that the policy will be affected by the regulatory change.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system that monitors changes in regulations as well as comments from the public by crawling through various publications. The system can build a dynamic linkage from homogeneous or heterogeneous domains for cross-domain inference by identifying the implicit association between influenced objects. The influenced objects can be captured from regulation decipherment; and, the evolution of the influenced objects can be identified along with the accumulation of public decipherment. Moreover, the implicit linkage of the influenced objects can be explored in order to obtain more accurate influence information.

The system can analyze documents published for comments so that compliance leaders can react during consultation. The system can then publish update alerts on compliance. Based on contextual analysis of changes in regulations, the system can point to specific policy documents which need updating, completion, and/or deletion.

Figure 1:
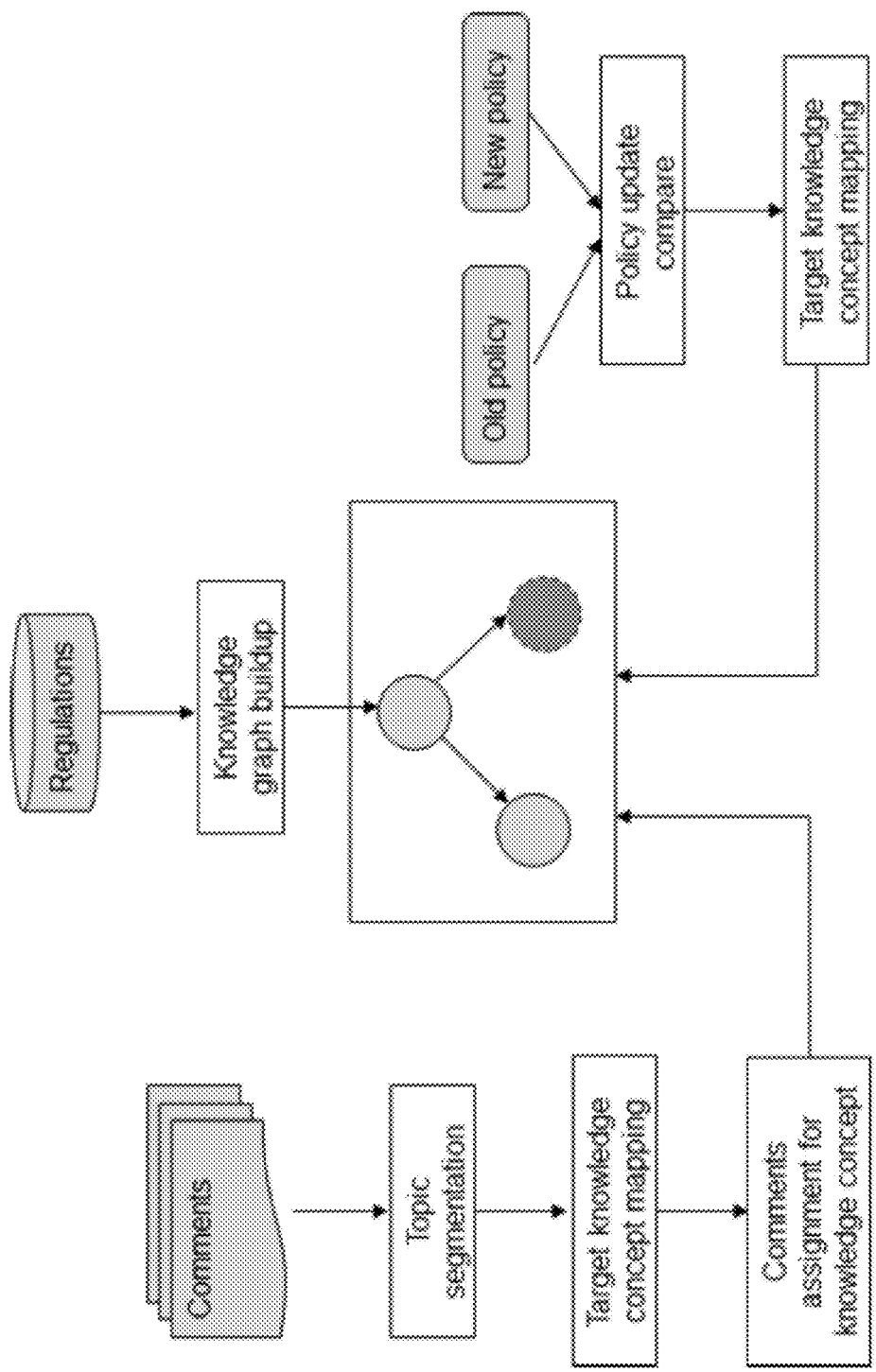
FIG. 1 is a diagram illustrating a system and method of automatic update detection for regulation compliance according to an embodiment of the invention.
Figure 2:
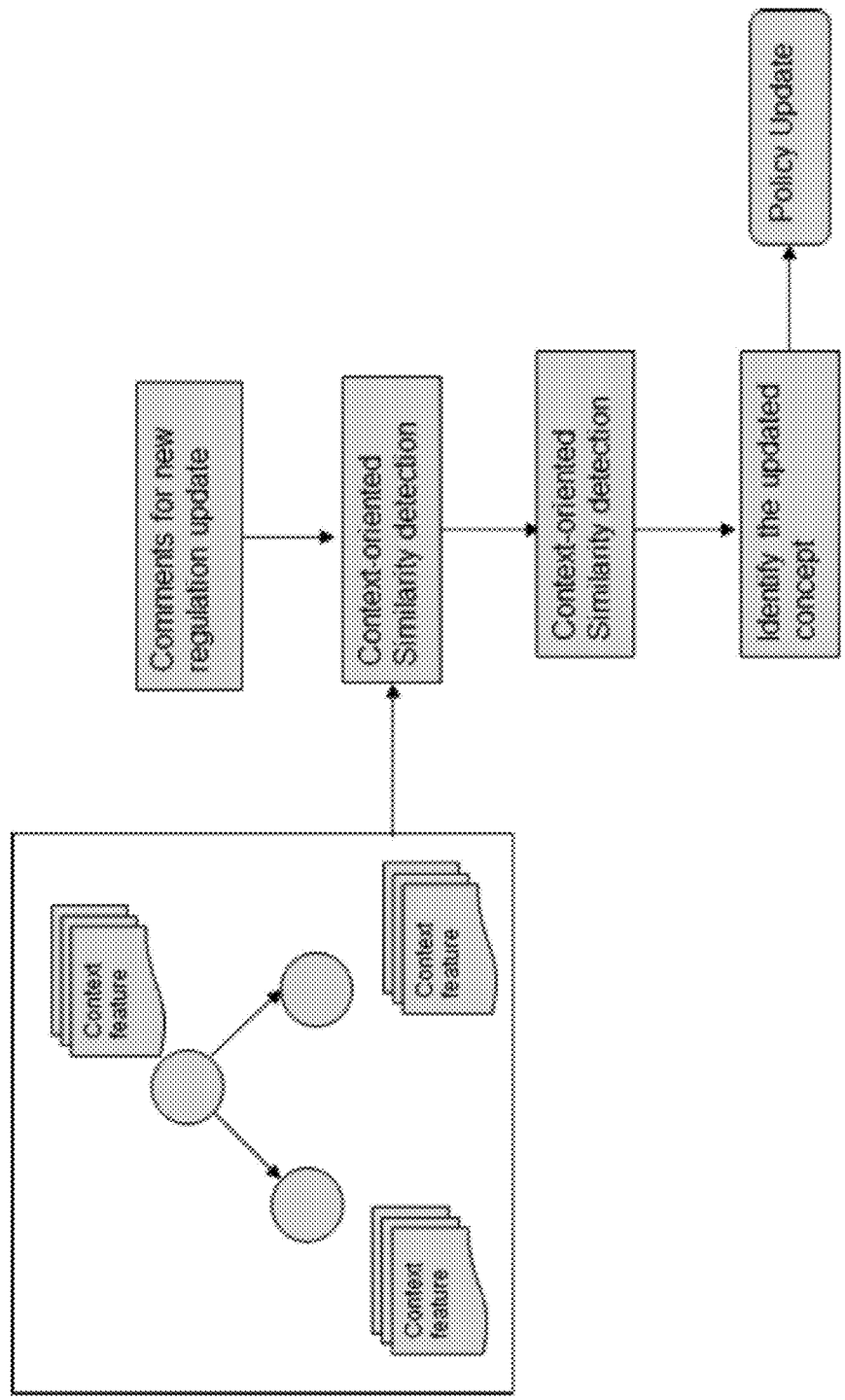
FIG. 2 is a diagram illustrating a system and method of automatic update detection for regulation compliance according to another embodiment of the invention.

FIG. 1 is a diagram illustrating a system and method of automatic update detection for regulation compliance according to an embodiment of the invention. The system can provide for automatic regulation update detection for compliance, which can contain comment-based similarity matching for regulation update identification, and text context enrichment for domain knowledge graph description. FIG. 2 is a diagram illustrating a system and method of automatic update detection for regulation compliance according to another embodiment of the invention.

The system can review documents published for comments and collect the insights for deep understand of regulation change in detail. The system can further explore the implicit related objects, including the agency, organization etc., being influenced by the change according to the opinion for the relevant entities according to the deep social association. The system then can serve various departments by providing update alerts for regulation compliance.

The following provides an illustrative example of regulation and decipherment, wherein a unified system is applied for elementary and secondary school enrollment service in the city. The entrance ways are fully recorded for each student; and, the administrative departments of education have the right for querying and monitoring. This proposed regulation clarifies that all the Board of Education for each county should publish all the covered primary schools, junior high school, elementary, and middle schools. In recent years, Haidian, Chaoyang, and Fengtai District have not publicly released this information.

Further regulation proposals standardize the students' enrollment process: with the exception of quotas for sports and arts students approved by the City Board of Education, schools are not allowed to recruit students having a specialty. Students with excellent Chinese traditional culture have the benefits for enrollment. District Education Commission should publicize the plan for recruitment of students having specialty. The recruited students in 2015 should not exceed the proportion in 2014.

This is a special provision this year, where students who learn folk music or Chinese opera will benefit from this policy. It has been regulated that the enrollment percent of students having a specialty will be less than or equal to 2014. The enrollment percentage of students having a specialty in Chaoyang, Dongcheng District and Xicheng District is about 6%-8%. The proportion in Haidian and Fengtai Districts is about 4%.

Figure 3:
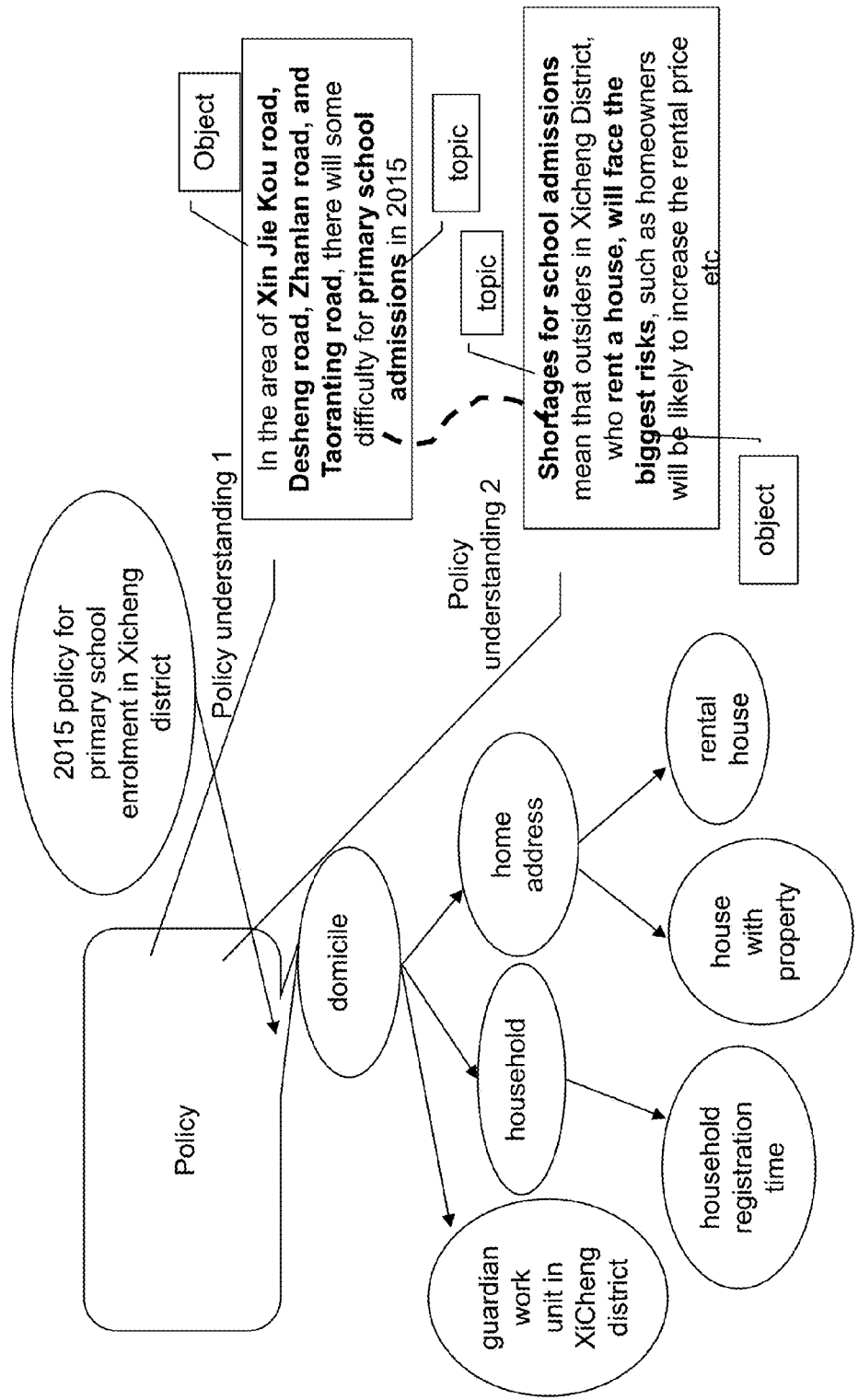
FIG. 3 is a diagram illustrating a system and method for automatic update detection for regulation compliance according to yet another embodiment of the invention.

FIG. 3 is a diagram illustrating a system and method for automatic update detection for regulation compliance according to an embodiment of the invention. The proposed policy 310 provides that children (born before Aug. 31, 2009) who will go to elementary school in Xicheng District need to provide their accounts in Xicheng District, or household registration, or the actual place of residence in the city in Xicheng District (housing or rental housing); and, if the student quantity is greater than the number of degrees, the priority is: children whose guardian(s) live and own property in the district, children whose guardian(s) work in the district, and children whose guardian(s) have rented in the district the longest.

An analysis of the proposed policy 310 can provide the following policy understanding 320: in the area of Xin Jie Kou, Desheng road, Zhanlan road, and Taoranting road, there will some difficulty for primary school admissions. "Xin Jie Kou, Desheng road, Zhanlan road, and Taoranting road" can be identified as objects; and, "primary school admissions" can be identified as a topic. An analysis of the proposed policy 310 can also provide the following policy understanding 330: shortages for school admissions mean that students in Xicheng district who rent a house will face the biggest risks. "Rent a house will face the biggest risks" can be identified as objects; and, "shortages for school admissions" can be identified as a topic.

Figure 4:
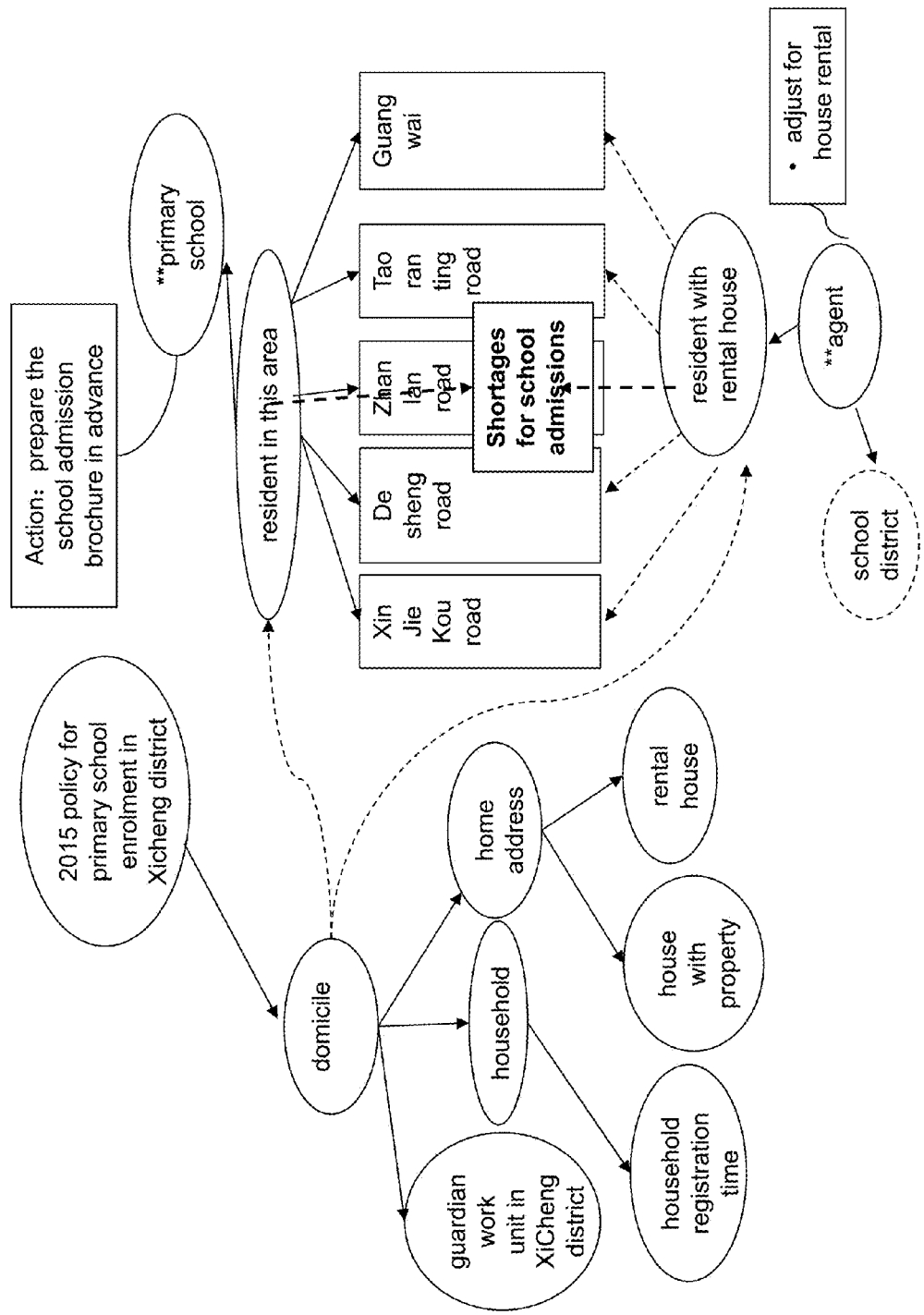
FIG. 4 illustrates a method processing example according to an embodiment of the invention.
Figure 5:
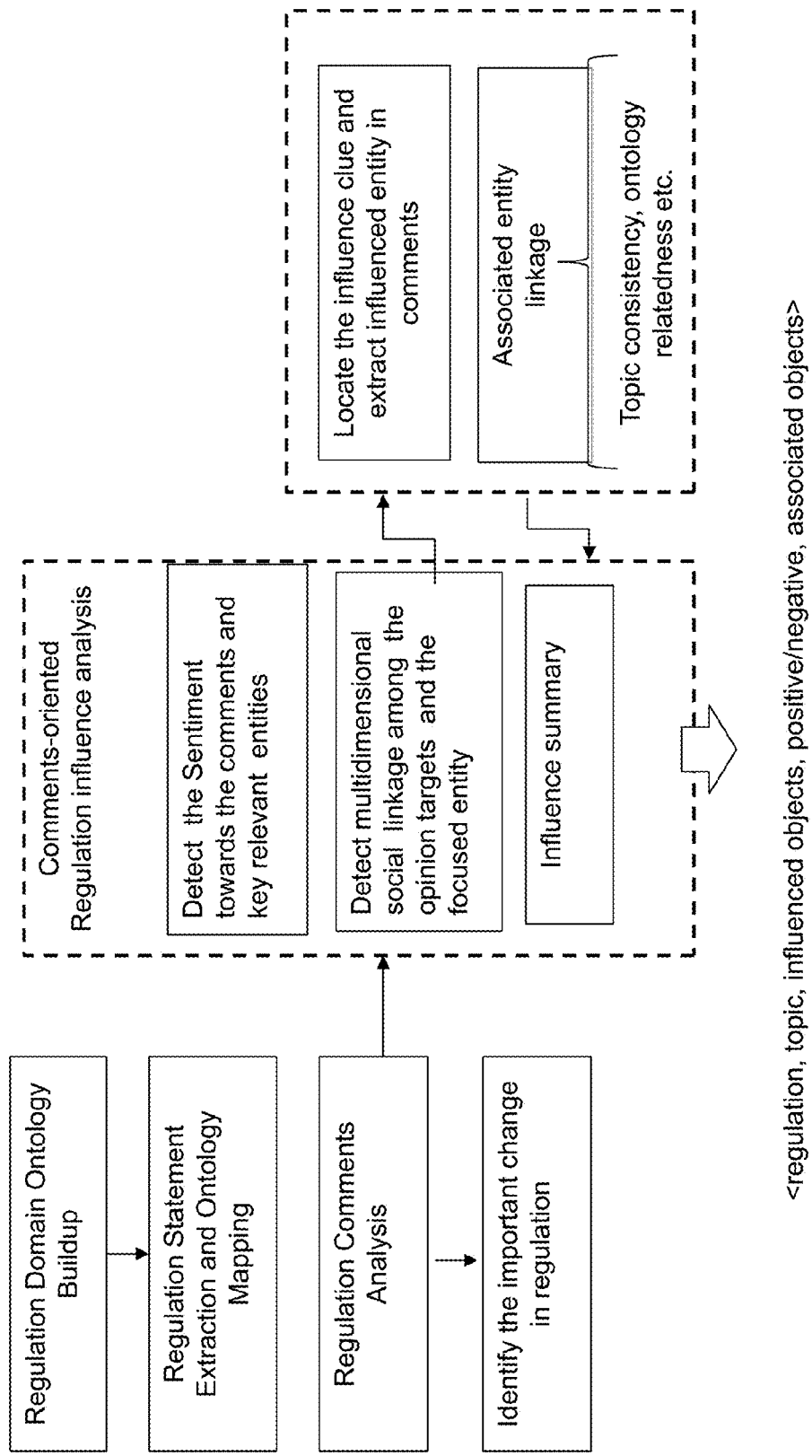
FIG. 5 illustrates a flow diagram for a method process according to an embodiment of the invention.

FIG. 4 illustrates a method processing example according to an embodiment of the invention; and, FIG. 5 illustrates a flow diagram for a method process according to an embodiment of the invention. The system for automatic regulation update influence analysis can include comment-based regulation update insights detection and influence analysis. The system can also include ontology enrichment based on public decipherment and ontology association based on the linkage of the influence.

The system can build a dynamic linkage from homogeneous or heterogeneous domains for cross-domain inference by identifying the implicit association between influenced objects. The system can capture the influenced objects from regulation decipherment and identify the evolution of the influenced objects along with the accumulation of public decipherment. Moreover, the system can explore the implicit linkage of the influenced objects to get more accurate influence information.

In at least one embodiment, the system identifies when changes in regulation occurs, what are the influenced objects, and how the impact change along with the time. Furthermore, the influenced objects have potential social relationships, which can be used to get the influence more accurately.

The system can identify the public response to the regulatory change, and then identify the influence. The system can identify the discussion from public opinion on the legal requirement changes to evaluate the influence impact taken by the changes. Moreover, the system can track the impact from the regulation change and the impact change along with the time.

At least one embodiment of the invention provides a method and device for risk alert with entity oriented hidden social association. The system can figure out the potential impact of the opinion and event on the relevant entities according to the deep social association and sentiment propagation.

Figure 6:
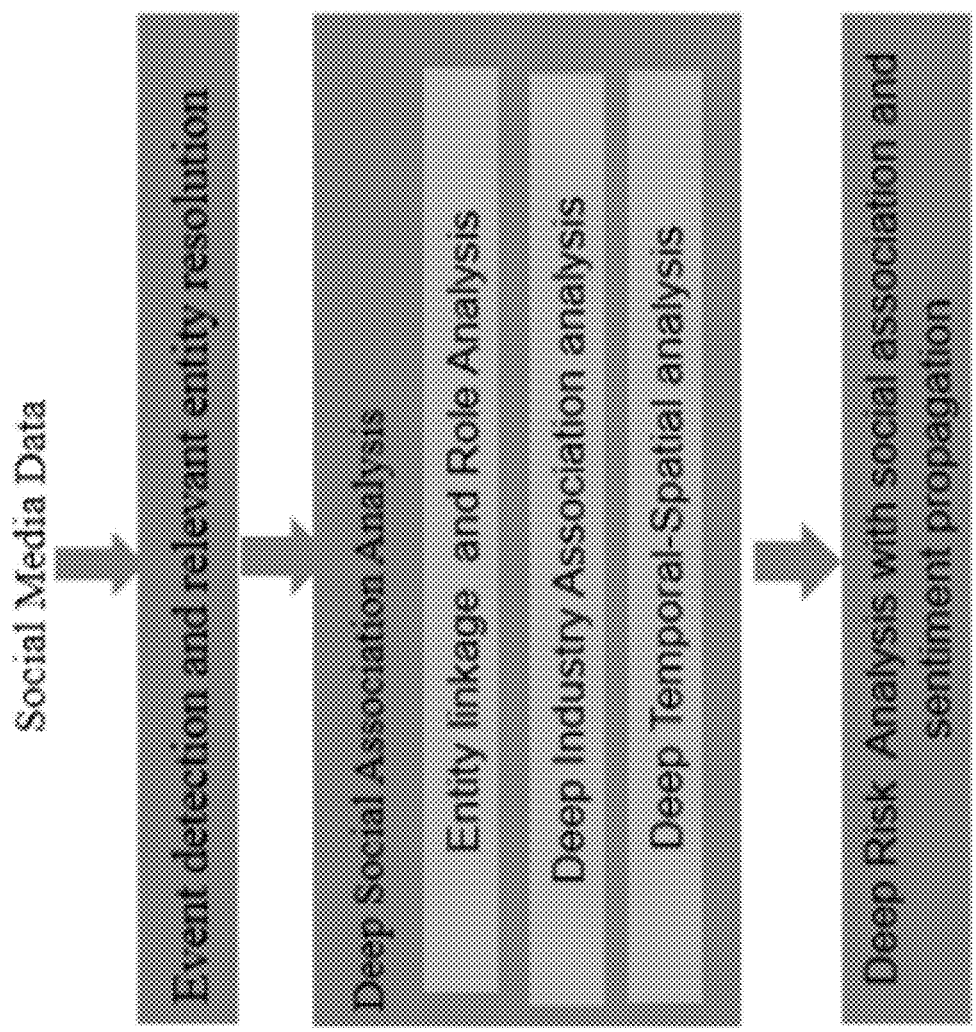
FIG. 6 is a flow diagram illustrating a method for risk alert with hidden social association according to an embodiment of the invention.

FIG. 6 is a flow diagram illustrating a method for risk alert with hidden social association according to an embodiment of the invention. The system can detect the event and key relevant entities. This can include the location and temporal information about the event and/or entities. An entity can be a customer/consumer group, an enterprise, an organization, a product, etc.

Deep social association analysis can detect multidimensional social association(s) between the given entity and the mentioned entities. A social association can include a role association (e.g., competitor, partner, etc.), an industry chain association, and/or a spatial or temporal association. A risk alert can be generated with deep social association and sentiment propagation. This can include the entity-oriented explicit sentiment impact and/or the hidden sentiment impact with deep social and temporal-spatial association.

Figure 7:
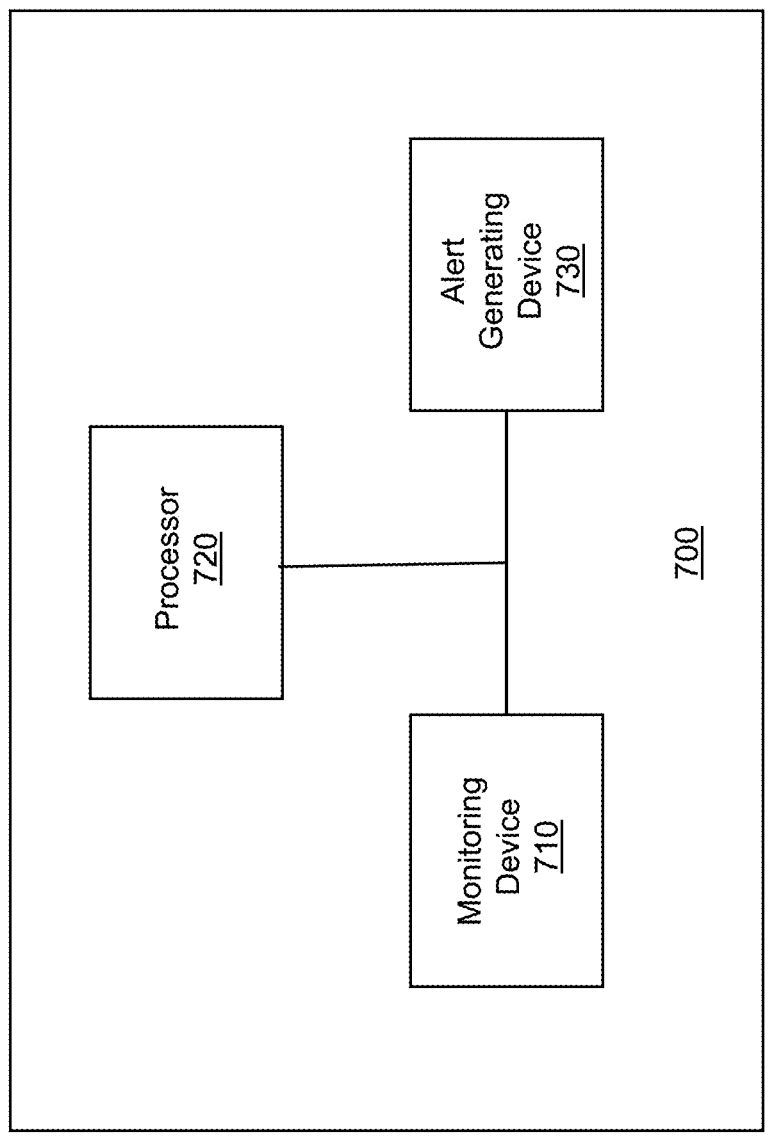
FIG. 7 is diagram illustrating a system for monitoring regulation changes and comments according to an embodiment of the invention.
Figure 8:
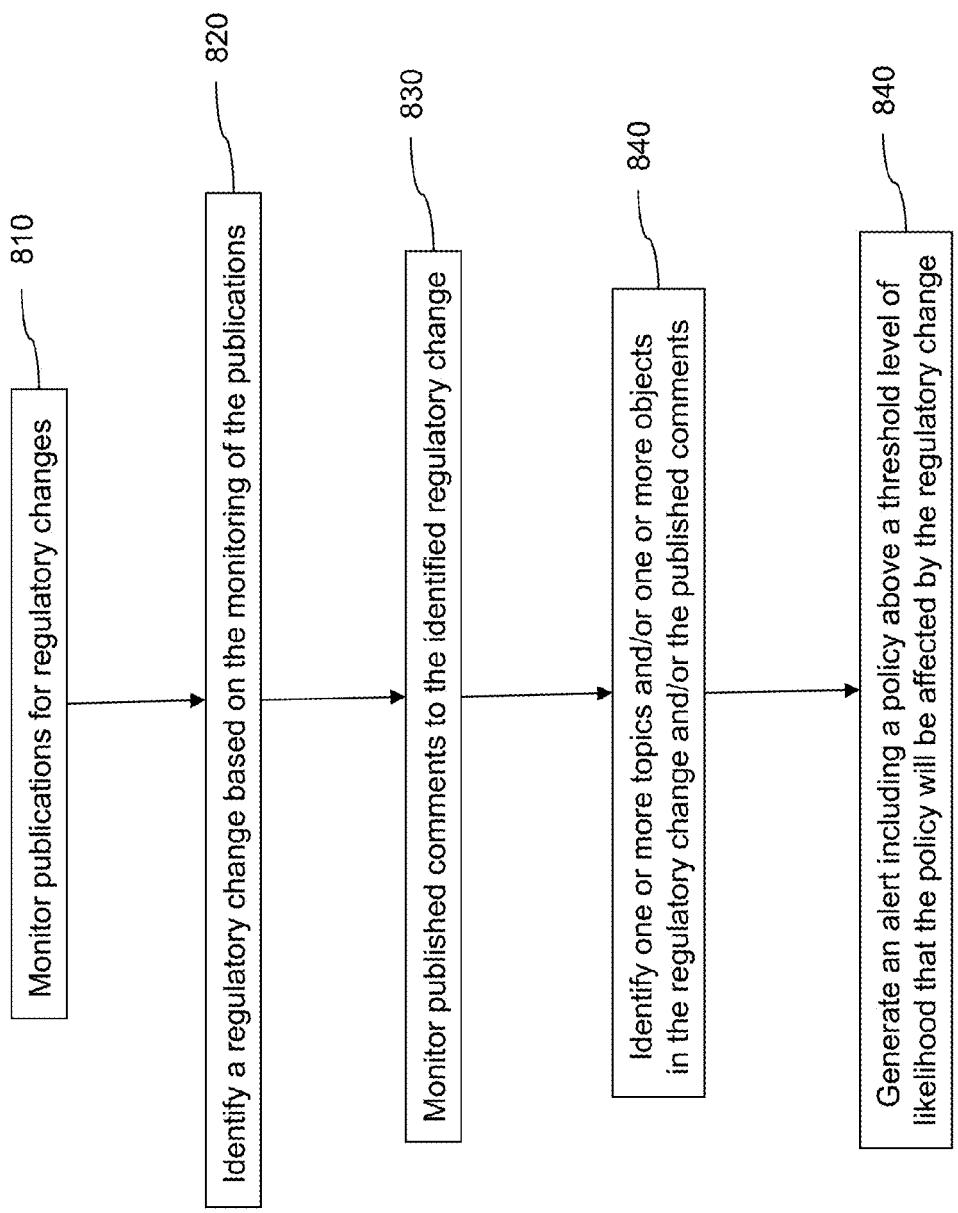
FIG. 8 is a flow diagram illustrating a method for monitoring regulation changes and comments according to an embodiment of the invention.

FIG. 7 is a flow diagram illustrating a system 700 for monitoring regulation changes and comments according to an embodiment of the invention. FIG. 8 is a flow diagram illustrating a method for monitoring regulation changes and comments (e.g., using the system 700) according to an embodiment of the invention. A monitoring device 710 monitors publications for regulatory changes 810. As used herein, the term "publications" can include printed content and content posted on the internet. For example, the monitoring device 710 crawls the Web searching for changes in the Federal Drug Administration (FDA) and state laws. One or more regulatory changes can be identified based on the monitoring of the publications 820 (e.g., with a processor). In addition, the monitoring device 710 can monitor published comments to the identified regulatory change 830. For example, the monitoring device 710 can monitor social media websites for comments to a regulatory change.

A processor 720 connected to the monitoring device 710 can identify one or more topics and/or one or more objects in the regulatory change and/or the published comments 840. The topic can include one or more words describing the regulation subject to the regulatory change (e.g., primary school admissions). The object can include one or more entities above a threshold level of likelihood that the entity will be affected by the regulatory change (e.g., Xin Jie Kou road, Desheng road, Zhanlan road, and Taoranting road). In at least one embodiment, the topic and/or object are based on the published comments.

The processor 720 can also identify a sentiment towards the identified regulatory change based on the monitoring of the published comments. The processor 720 can identify comments in the published comments that have a threshold degree of similarity based on the identifying topic and/or object in the regulatory change and/or the published comments. The processor 720 can group comments in the published comments based on similarity.

The topic can be extracted by a statistics and natural language processing process or a mining process, such as latent dirichlet allocation (LDA). The extracted topic can be one of the elements to represent the influence of the updated regulation. The extracted topic can describe which aspects will be effected. The object can be extracted by using entity recognition. The object can describe who will be influenced by the change of regulation. There can be a lot of comments once a regulation is changed. In at least one embodiment, different expressions are used by different people; and as such, a consistent mapping between the concepts is performed, which is described in various styles, but represent the same thing.

An alert generating device 730 can be connected to the processor 720, which can generate an alert 850 (e.g., based on the identifying of the topic and the object). The alert can include a policy above a threshold level of likelihood that the policy will be affected by the regulatory change. As used herein, the terms "alert generating device" and "monitoring device" can each include a computer hardware device (e.g., CPU, microprocessor). Moreover, as used herein, the term "connected" includes operationally connected, logically connected, in communication with, physically or wirelessly connected, engaged, coupled, contacts, linked, affixed, and attached.

The processor 720 can create a domain regulation ontology and identify associations between identified topics and concepts in the domain regulation ontology. The processor 720 can also select a key topic from the identified topics according to the reference on ontology (i.e., according to the identified associations between the topics and the concepts in the domain regulation ontology). In addition, the processor 720 can identify associations between identified objects and concepts in the domain regulation ontology, and select a key object from the identified topics according to the reference on ontology (i.e., according to the identified associations between the objects and the concepts in the domain regulation ontology).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
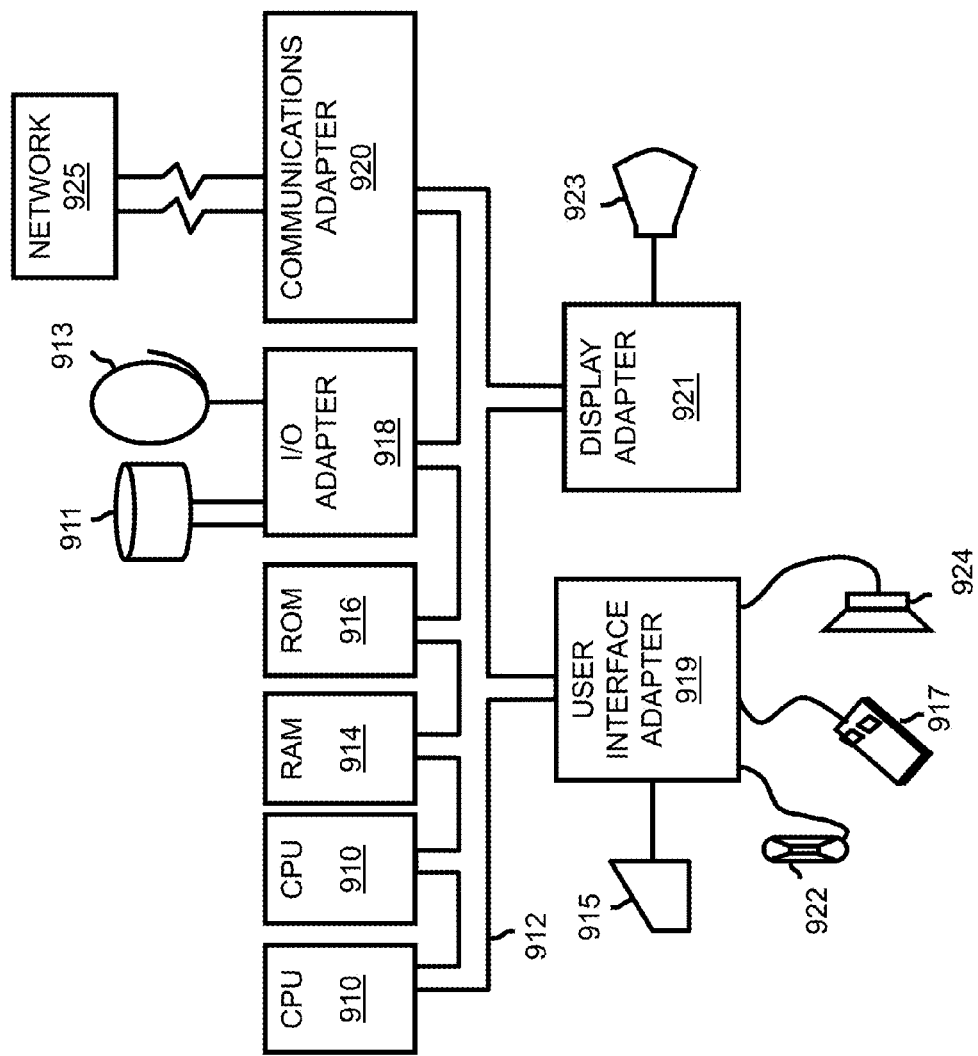
FIG. 9 is a diagram illustrating a computer program product according to an embodiment of the invention.

Referring now to FIG. 9, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 910. The CPUs 910 are interconnected with system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system. The system can read the inventive instructions on the program storage devices and follow these instructions to execute the methodology of at least one embodiment of the invention. The system further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network 925, and a display adapter 921 connects the bus 912 to a display device 923 which may be embodied as an output device such as a monitor, printer, or transmitter, for example.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
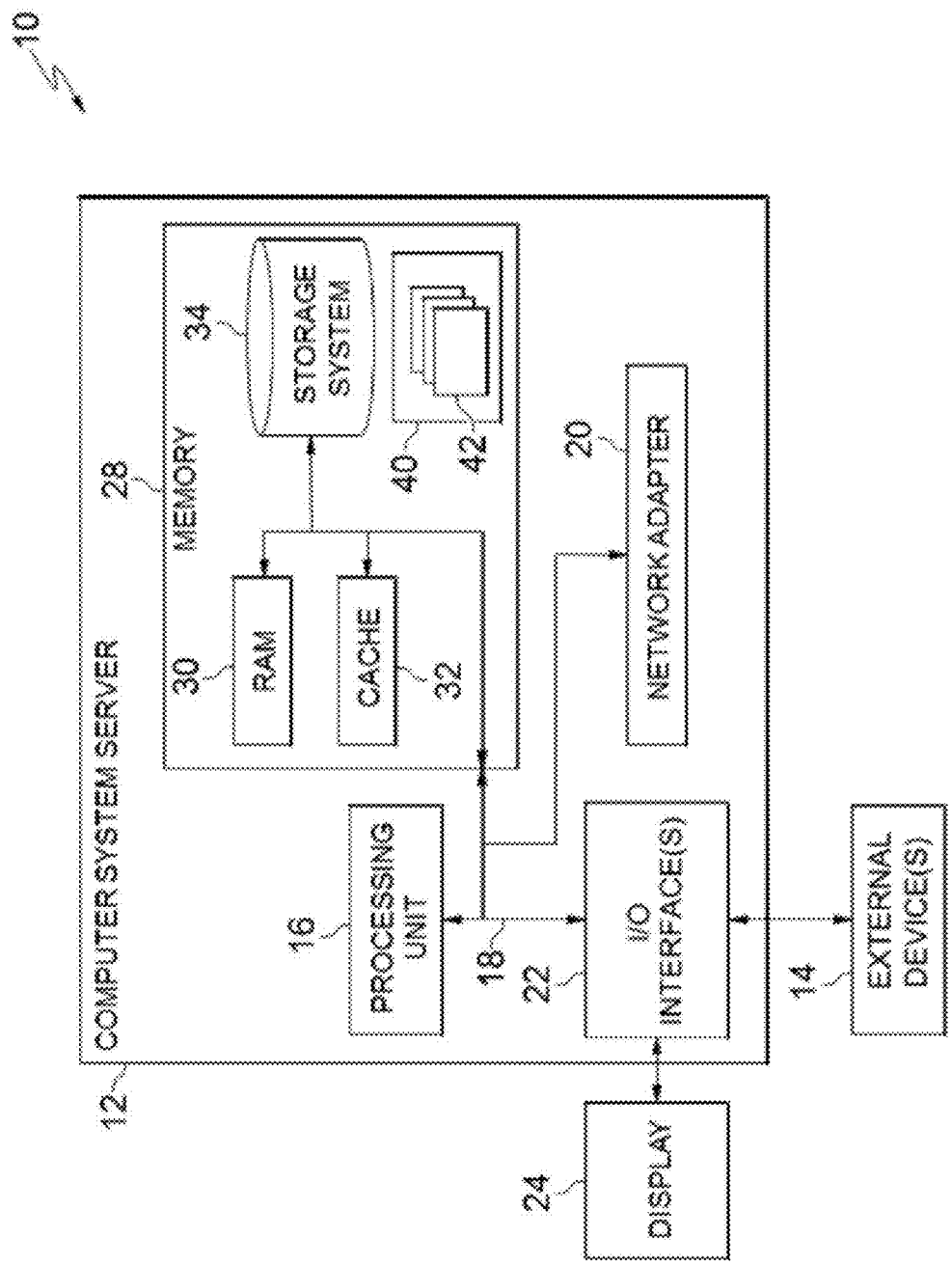
FIG. 10 depicts a cloud computing node according to an embodiment of the present invention.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
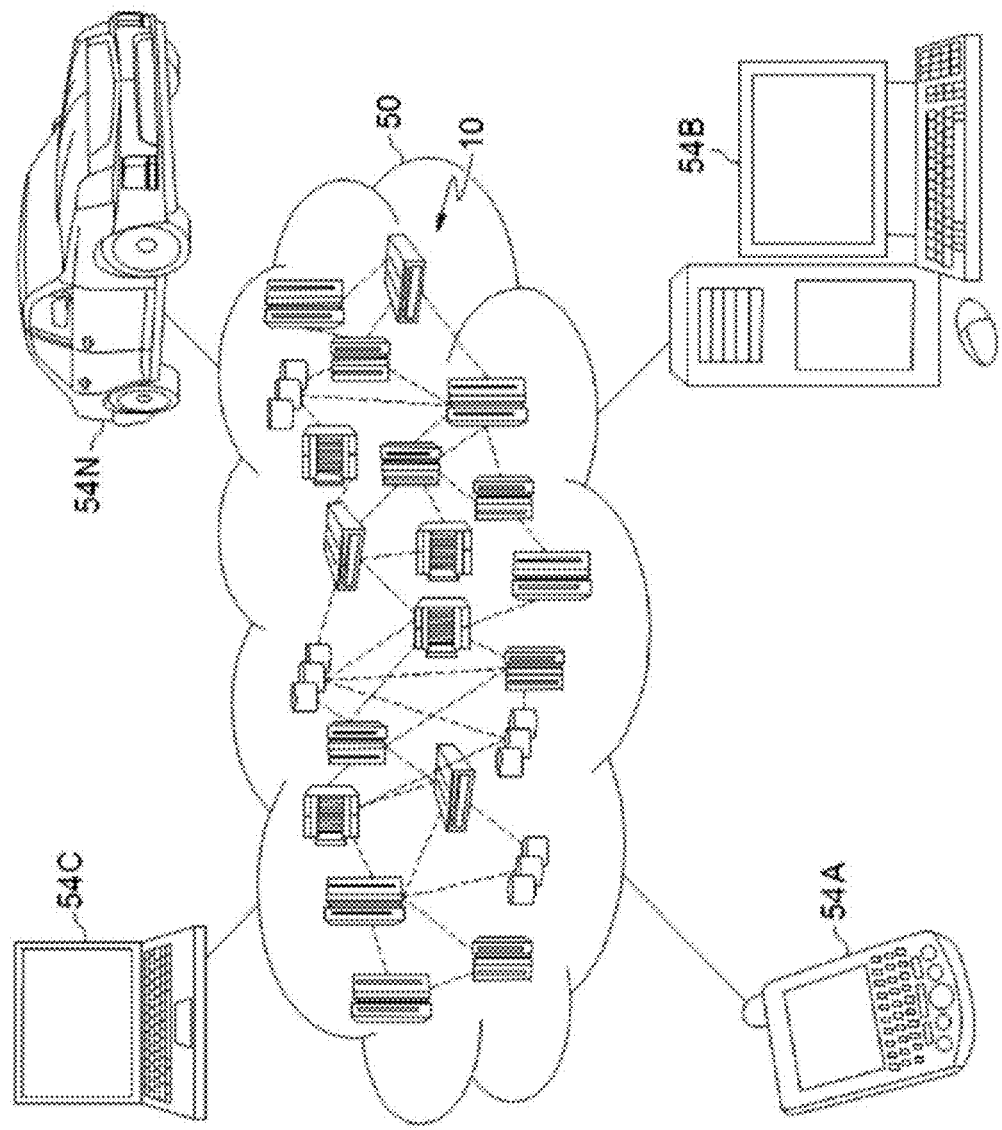
FIG. 11 depicts a cloud computing environment according to an embodiment of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
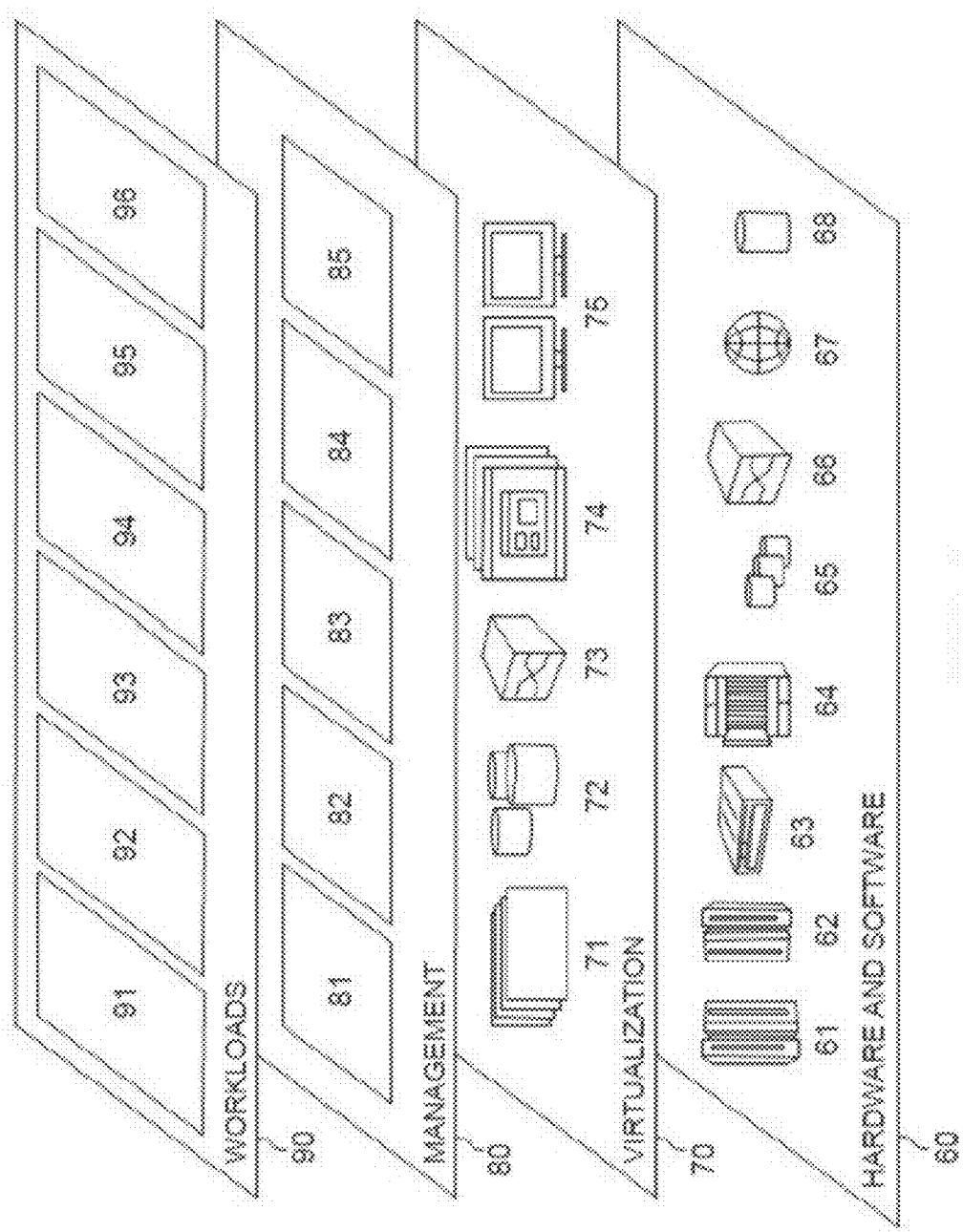
FIG. 12 depicts abstraction model layers according to an embodiment of the present invention.
Figure 13:
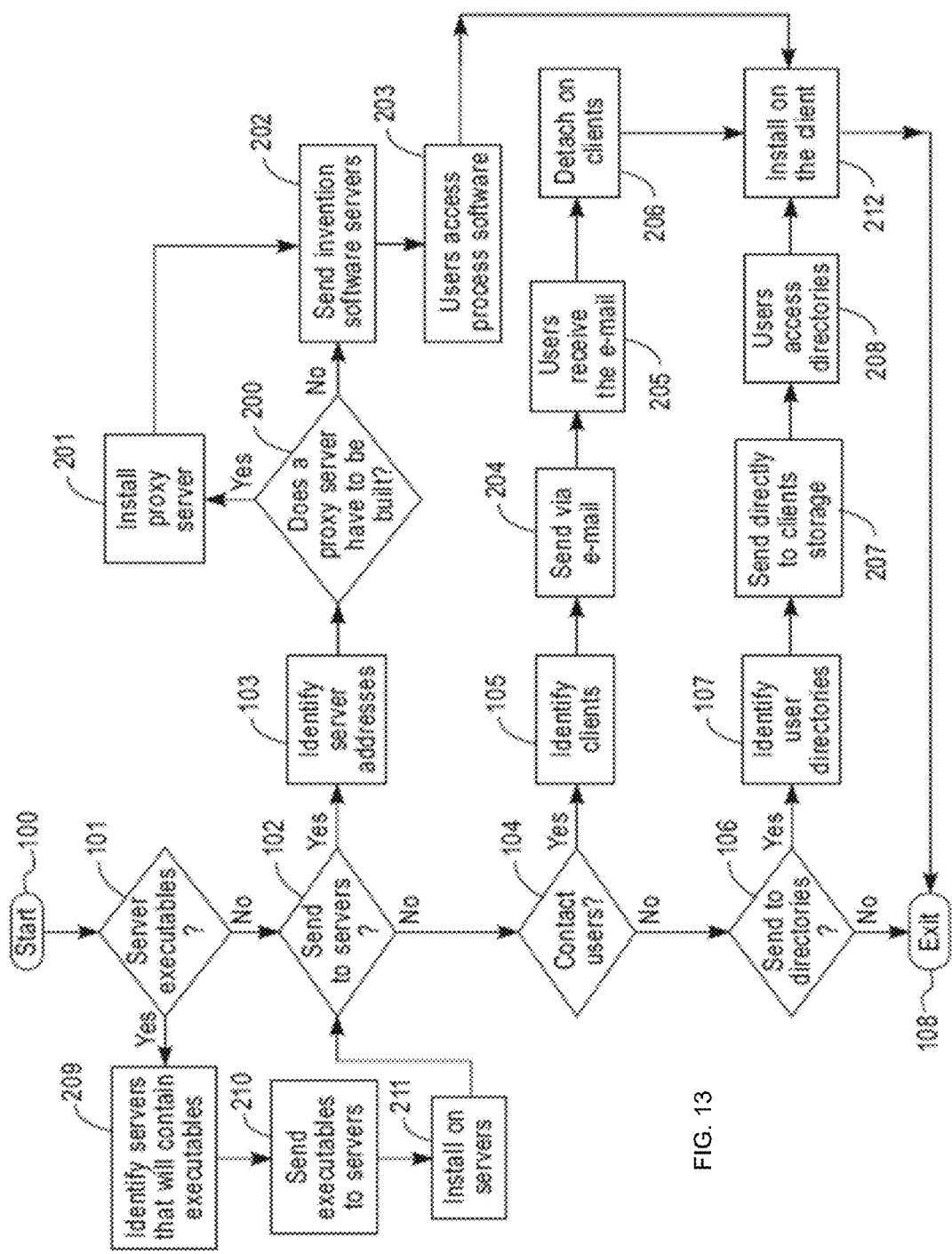
FIG. 13 is a diagram illustrating a system and method for deployment according to an embodiment of the invention.
Figure 14:
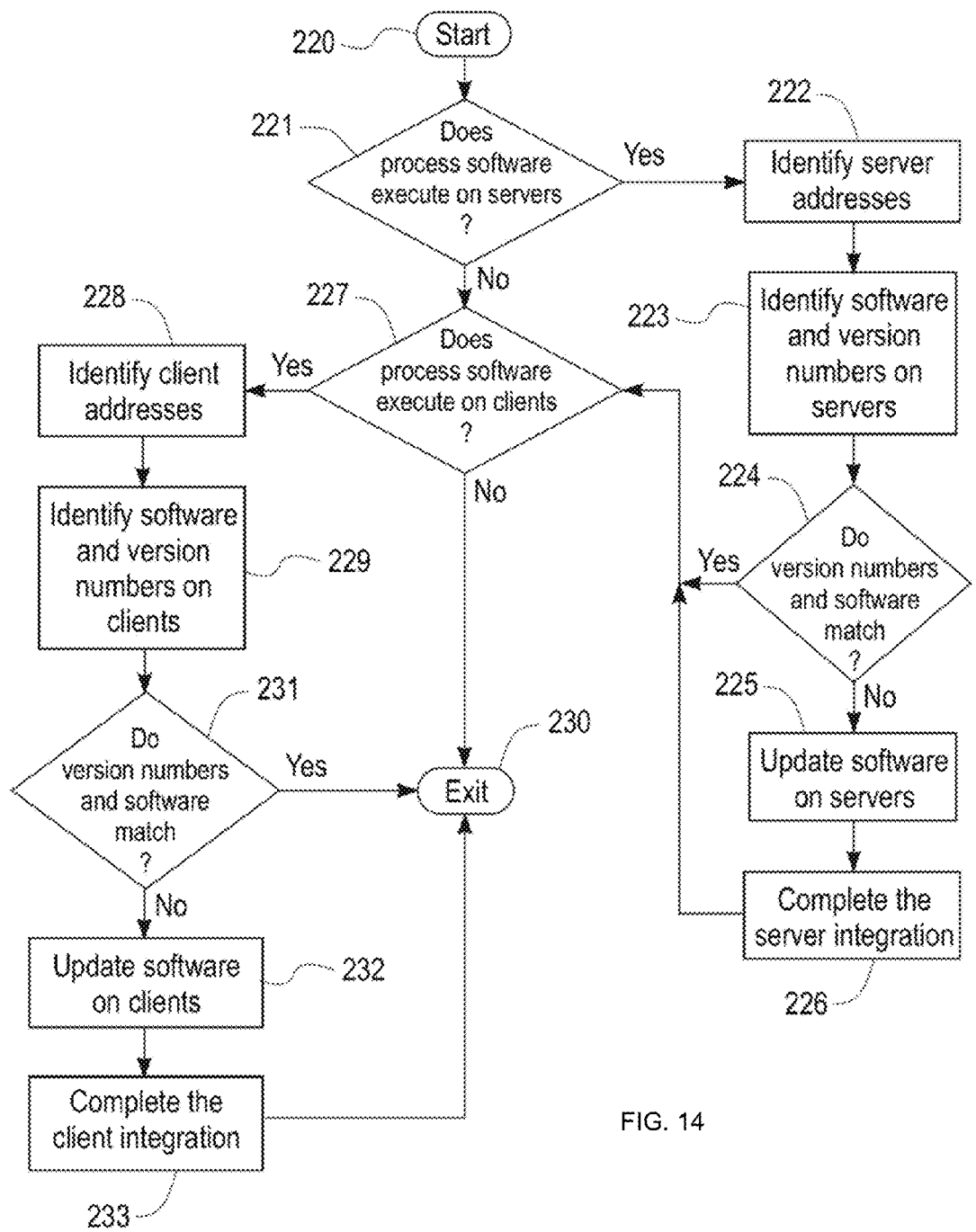
FIG. 14 is a diagram illustrating a system and method for integration according to an embodiment of the invention.
Figure 15:
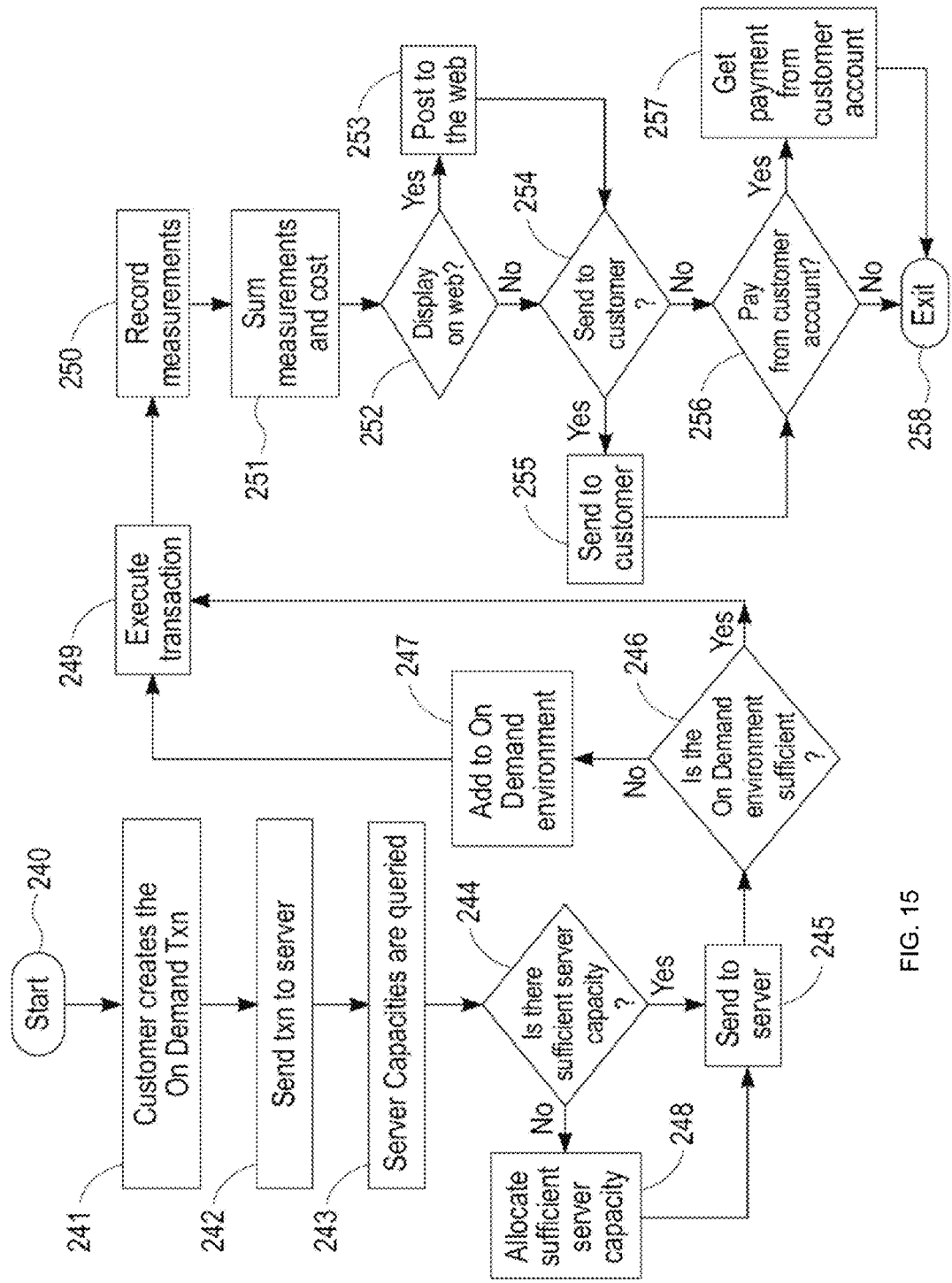
FIG. 15 is a diagram illustrating a system and method for on demand according to an embodiment of the invention.
Figure 16:
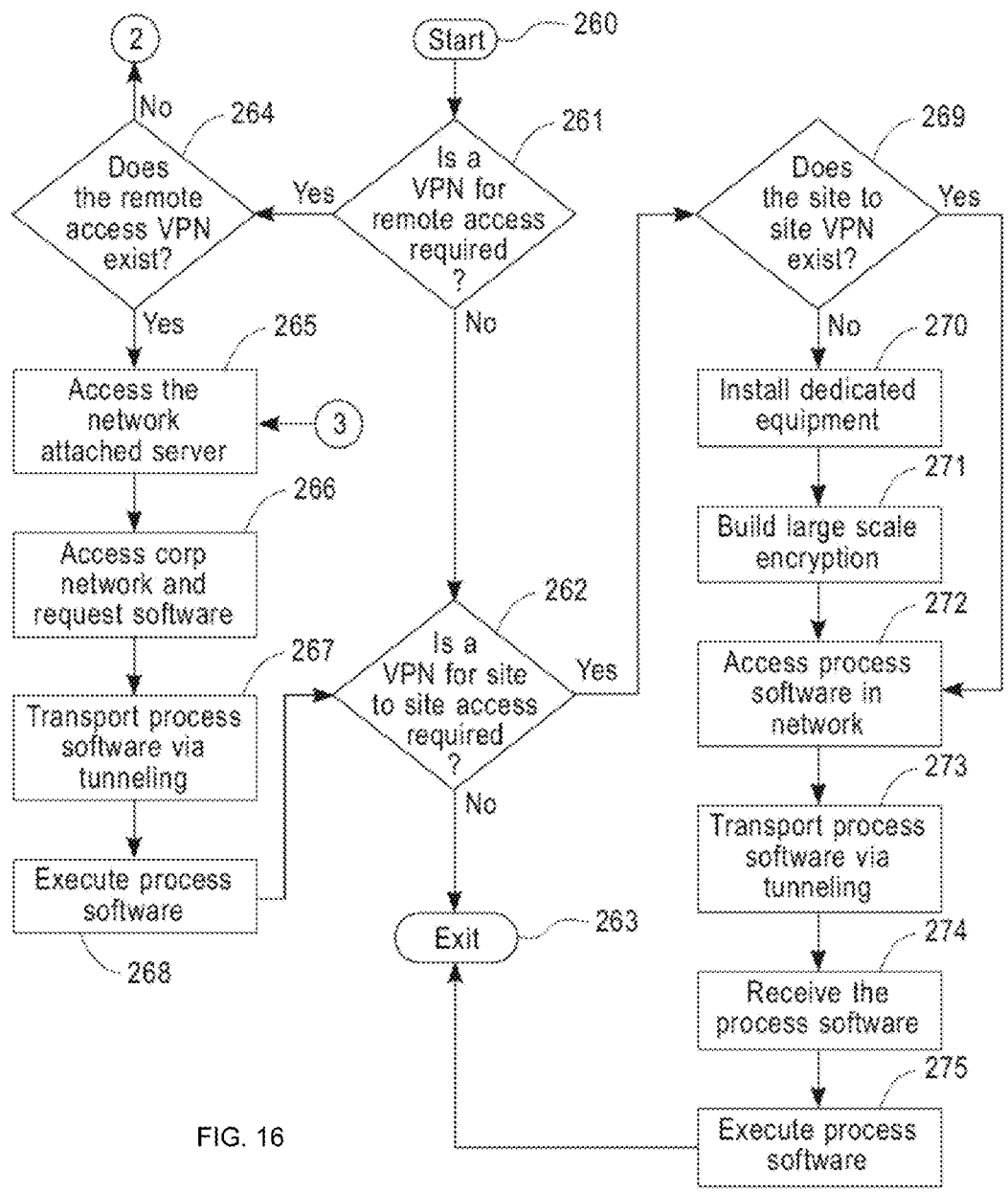
FIG. 16 is a diagram illustrating a system and method for a virtual private network service according to an embodiment of the invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic update detection 96.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server and then it will be stored on the proxy server.

Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211. Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via email to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software which consists of is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers that have been tested with the process software 229. The clients are also checked to determine if there is any missing software that is required by the process software 229.

A determination is made is the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements f use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 240 begins the On Demand process. A transaction is created than contains the unique customer identification, the requested service type and any service parameters that further specify the type of service 241. The transaction is then sent to the main server 242. In an On Demand environment the main server can initially be the only server, and then as capacity is consumed other servers are added to the On Demand environment.

The server central processing unit (CPU) capacities in the On Demand environment are queried 243. The CPU requirement of the transaction is estimated, then the server's available CPU capacity in the On Demand environment is compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, and then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251.

If the customer has requested that the On Demand costs be posted to a web site 252 then they are posted 253. If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   automatically monitoring, via processing circuitry and without user input, publications for regulatory changes;
   identifying, via web crawling by the processing circuitry, at least one regulatory change based on said monitoring of the publications;
   monitoring, in response to identifying the regulatory change, published comments to the identified regulatory change;
   identifying, via the processing circuitry, at least one topic and a plurality of objects in the regulatory change and the published comments, a plurality of objects influenced by the regulatory change, and how an impact of the regulatory change changes with time, each object describing what will be affected by the regulatory change;
   generating in memory a dynamically linked object mapping of the identified objects;
   identifying a sentiment towards the identified regulatory change based on said monitoring of the published comments and the dynamically linked object mapping;
   generating, based on the at least one topic and objects, an alert with an alert generating device connected to the processing circuitry, the alert including at least one policy above a threshold level of likelihood that it will be affected by the regulatory change;
   identifying a hidden social association with respect to the regulatory change based on the sentiment;
   generating, by the alert generating device and in response to identifying the hidden social association, an alert indicating the hidden social association with respect to the regulatory change.

2. The method according to claim 1, wherein the topic includes at least one word describing a regulation subject to the regulatory change.

3. The method according to claim 1, wherein the objects include at least one entity above a threshold level of likelihood that it will be affected by the regulatory change.

4. The method according to claim 1, further comprising:
   identifying comments in the published comments having a threshold degree of similarity based on said identifying of the topic and objects in at least one of the regulatory change and the published comments;
   grouping comments in the published comments based on similarity.

5. The method according to claim 1, further comprising:
creating a domain regulation ontology; and
identifying associations between identified topics and concepts in the domain regulation ontology.

6. The method according to claim 5, further comprising: selecting a key topic from the identified topics according to the ontology.

7. The method according to claim 4, further comprising:
creating a domain regulation ontology; and
identifying associations between identified objects and concepts in the domain regulation ontology.

8. The method according to claim 7, further comprising: selecting a key object from the identified topics according to the ontology.

9. A system providing automatic update detection for regulation compliance, said system comprising:
processing circuitry configured to
automatically monitor, without user input, publications for regulatory changes,
identify, via web crawling, at least one regulatory change based on said monitoring of the publications,
monitor, in response to identifying the regulatory change, published comments to the identified regulatory change,
identify at least one topic and a plurality of objects in the regulatory change and the published comments, a plurality of objects influenced by the regulatory change, and how an impact of the regulatory change changes with time, each object describing what will be affected by the regulatory change,
generate in memory a dynamically linked object mapping of the identified objects;
identify a sentiment towards the identified regulatory change based on said monitoring of the published comments and the dynamically linked object mapping,
generate, based on the at least one topic and objects, an alert including at least one policy above a threshold level of likelihood that it will be affected by the regulatory change,
identify a hidden social association with respect to the regulatory change based on the sentiment;
generate, in response to identifying the hidden social association, an alert indicating the hidden social association with respect to the regulatory change.

10. The system according to claim 9, wherein the topic includes at least one word describing a regulation subject to the regulatory change.

11. The system according to claim 9, wherein the objects include at least one entity above a threshold level of likelihood that it will be affected by the regulatory change.

12. The system according to claim 9, wherein the processing circuitry is further configured to
identify comments in the published comments having a threshold degree of similarity based on said identifying of the topic and the objects in the regulatory change and the topic and the object in the published comments, and group comments in the published comments based on similarity.

13. The system according to claim 9, wherein the processing circuitry is further configured to
create a domain regulation ontology, and
identify associations between identified topics and concepts in the domain regulation ontology.

14. The method according to claim 13, wherein the processing circuitry is further configured to select a key topic from the identified topics according to the ontology.

15. The method according to claim 12, wherein the processing circuitry is further configured to
create a domain regulation ontology, and
identify associations between identified objects and concepts in the domain regulation ontology.

16. The method according to claim 15, wherein the processing circuitry is further configured to select a key object from the identified topics according to the ontology.

17. A non-transitory computer-readable medium having computer-readable instructions stored thereon which when executed by a computer cause the computer to perform a method comprising:
automatically monitoring, without use input, publications for regulatory changes;
identifying, via web crawling at least one regulatory change based on the monitoring of the publications;
monitoring, in response to identifying the regulatory change, published comments to the identified regulatory change;
identifying a topic and a plurality of objects in the regulatory change and in the published comments, a plurality of objects influenced by the regulatory change, and how an impact of the regulatory change changes with time, each object describing what will be affected by the regulatory change,
generating in memory a dynamically linked object mapping of the identified objects;
identifying a sentiment towards the identified regulatory change based on said monitoring of the published comments and the dynamically linked object mapping;
generating, based on the identifying of the sentiment, an alert including at least one policy above a threshold level of likelihood that it will be affected by the regulatory change;
identifying a hidden social association with respect to the regulatory change based on the sentiment;
generating, in response to identifying the hidden social association, an alert indicating the hidden social association with respect to the regulatory change.

18. The non-transitory computer-readable medium according to claim 17, further comprising:
identifying a sentiment towards the identified regulatory change based on said monitoring of the published comments.

* * * * *

UNITED STATES PATENT AND TRADEMARK OFFICE
CERTIFICATE OF CORRECTION

PATENT NO. : 10,467,717 B2  
APPLICATION NO. : 15/081194  
DATED : November 5, 2019  
INVENTOR(S) : Keke Cai et al.

Page 1 of 1

It is certified that error appears in the above-identified patent and that said Letters Patent is hereby corrected as shown below:

On the Title Page

Item (74) At Attorney, Agent, or Firm, "Chan" should read --Cahn--.

Signed and Sealed this  
Tenth Day of March, 2020

Andrei Iancu  
*Director of the United States Patent and Trademark Office*